C. P. STRITE.
BREAD TOASTER.
APPLICATION FILED JUNE 22, 1920.
1,394,450.   Patented Oct. 18, 1921.
5 SHEETS—SHEET 1.
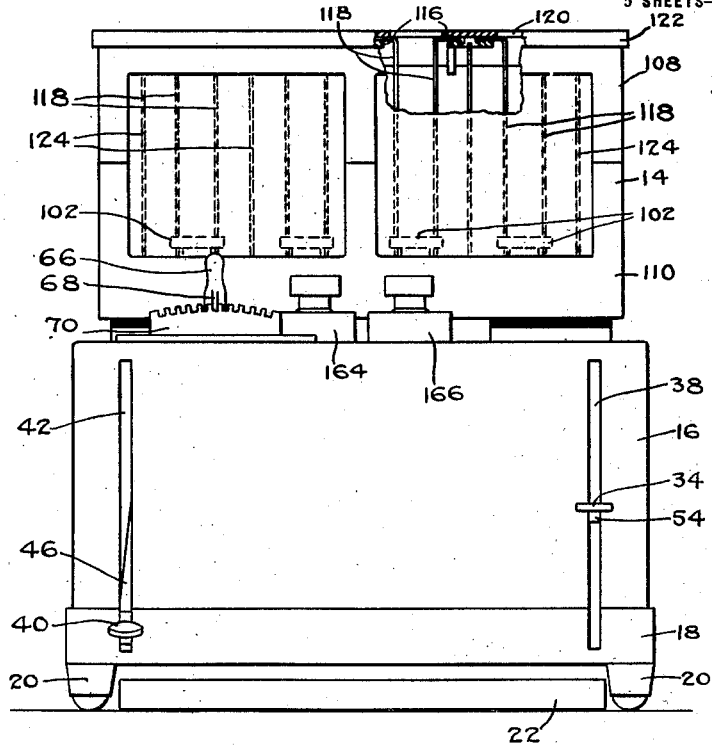
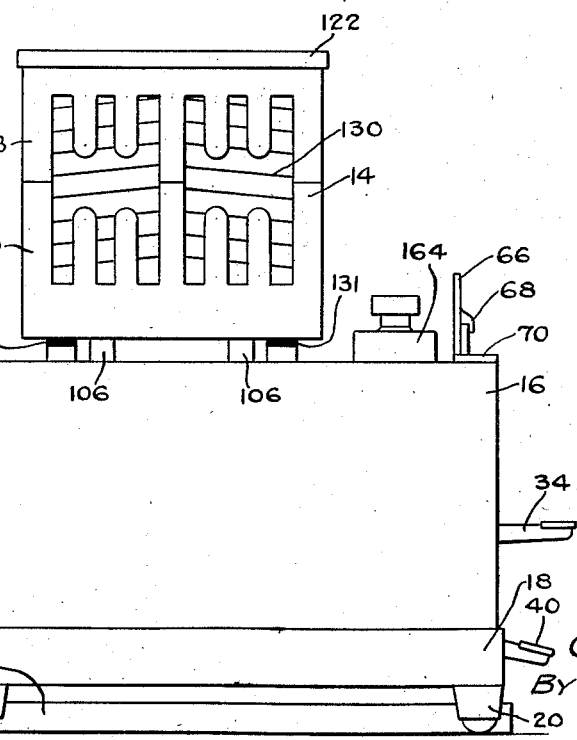
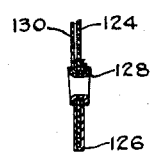
INVENTOR:
CHARLES P. STRITE.
BY Whiteley and Ruckman
ATTORNEYS.

C. P. STRITE.
BREAD TOASTER.
APPLICATION FILED JUNE 22, 1920.
1,394,450. Patented Oct. 18, 1921.
5 SHEETS—SHEET 2.
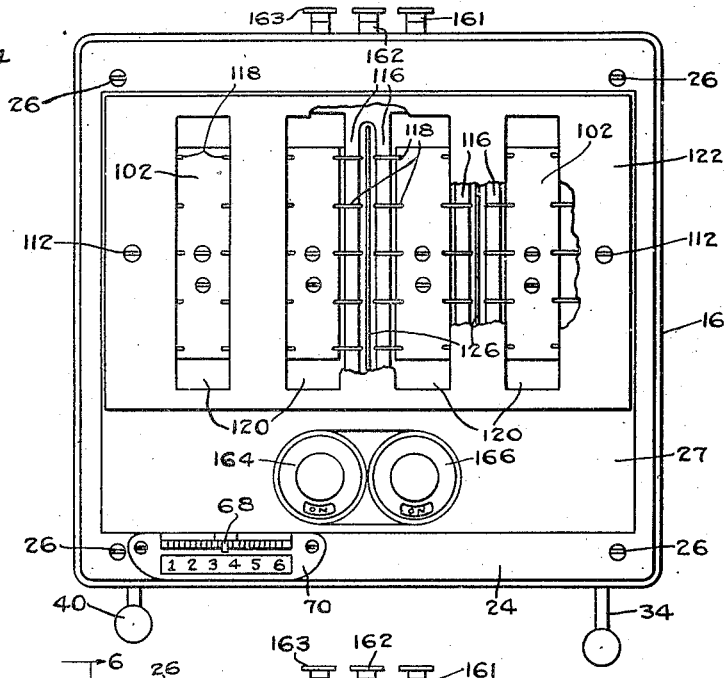
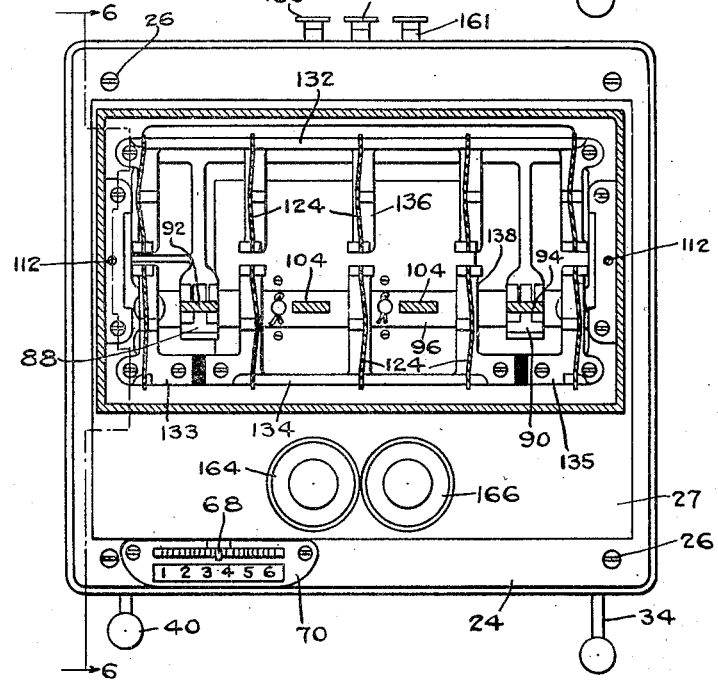
INVENTOR:
CHARLES P. STRITE.
BY Whiteley and Ruckman
ATTORNEYS.

C. P. STRITE.
BREAD TOASTER.
APPLICATION FILED JUNE 22, 1920.

1,394,450.

Patented Oct. 18, 1921.
5 SHEETS—SHEET 3.

INVENTOR:
CHARLES P. STRITE.
BY Whiteley and
Ruckman
ATTORNEYS

C. P. STRITE.
BREAD TOASTER.
APPLICATION FILED JUNE 22, 1920.
1,394,450.                    Patented Oct. 18, 1921.
                                        5 SHEETS—SHEET 4.
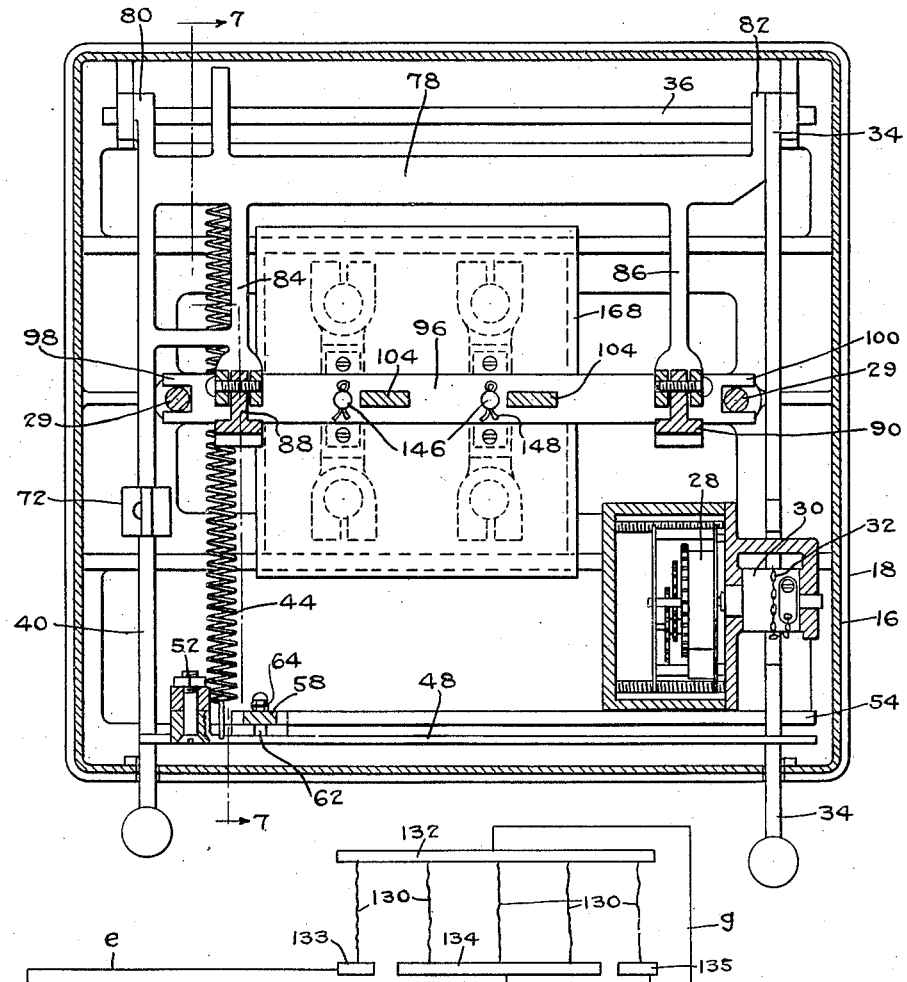
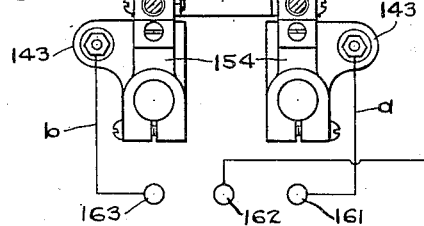
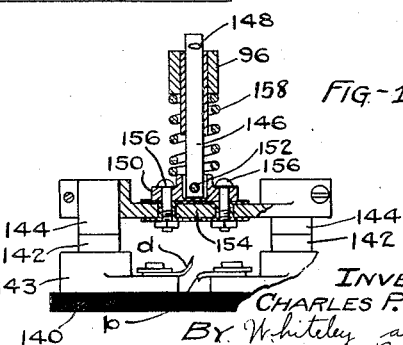
INVENTOR:
CHARLES P. STRITE,
BY Whiteley and Ruckman
ATTORNEYS.

C. P. STRITE.
BREAD TOASTER.
APPLICATION FILED JUNE 22, 1920.
1,394,450.
Patented Oct. 18, 1921.
5 SHEETS—SHEET 5.
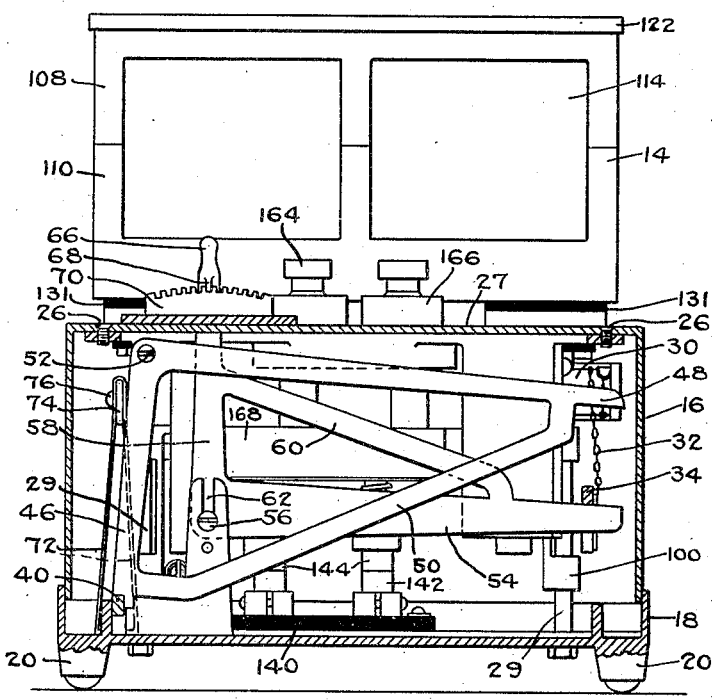
Fig-11.
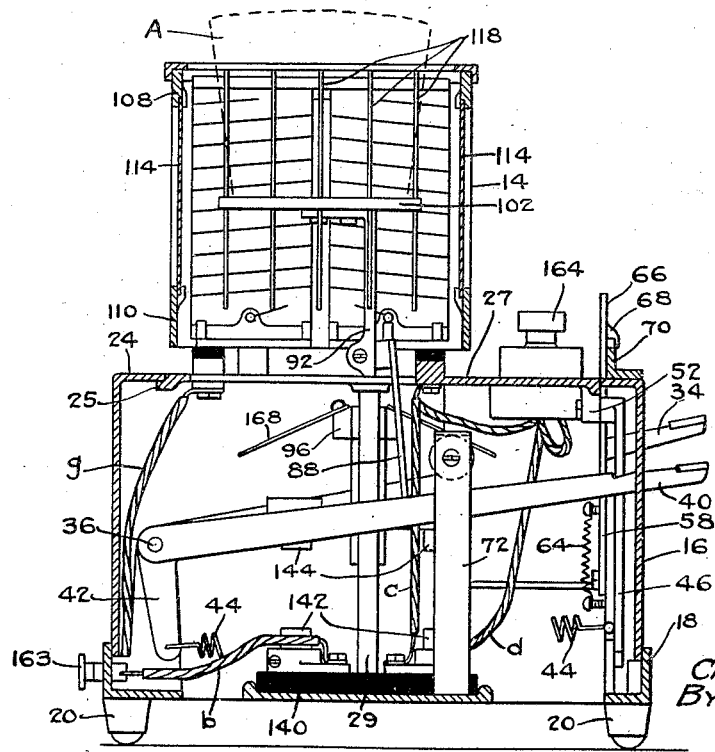
Fig-13.
Fig-12.
INVENTOR:
CHARLES P. STRITE.
BY Whiteley and Ruckman
ATTORNEYS.

UNITED STATES PATENT OFFICE.

CHARLES P. STRITE, OF MINNEAPOLIS, MINNESOTA.

BREAD-TOASTER.

1,394,450.  Specification of Letters Patent.  Patented Oct. 18, 1921.

Application filed June 22, 1920. Serial No. 390,706.

*To all whom it may concern:*

Be it known that I, CHARLES P. STRITE, a citizen of the United States, residing at Minneapolis, in the county of Hennepin and State of Minnesota, have invented certain new and useful Improvements in Bread-Toasters, of which the following is a specification.

My invention relates to bread toasters. An object is to provide an automatic electric bread toaster in which the heating current will be automatically cut off after the bread has been toasted for a predetermined length of time, which may be varied according to the amount of moisture in the bread and the degree of crispness desired for the toast. Another object is to provide a toaster in which the bread is toasted in a substantially closed casing or oven having windows through which the bread may be observed while it is being toasted. Another object is to provide a device in which the toast is automatically removed from the oven when the toasting operation is completed. Another object is to provide a toaster in which a number of slices of bread may be toasted and in which current may be supplied to all of the heating elements or only a portion of the same, depending upon the number of slices which it is desired to toast at any one time. Another object is to provide a toaster in which the toasting operation is performed electrically in an economical manner by means which is not liable to get out of order.

The full objects and advantages of my invention will appear in connection with the detailed description thereof and the novel features embodied in my inventive idea will be particularly pointed out in the claims.

In the acompanying drawings,—

Figure 6:
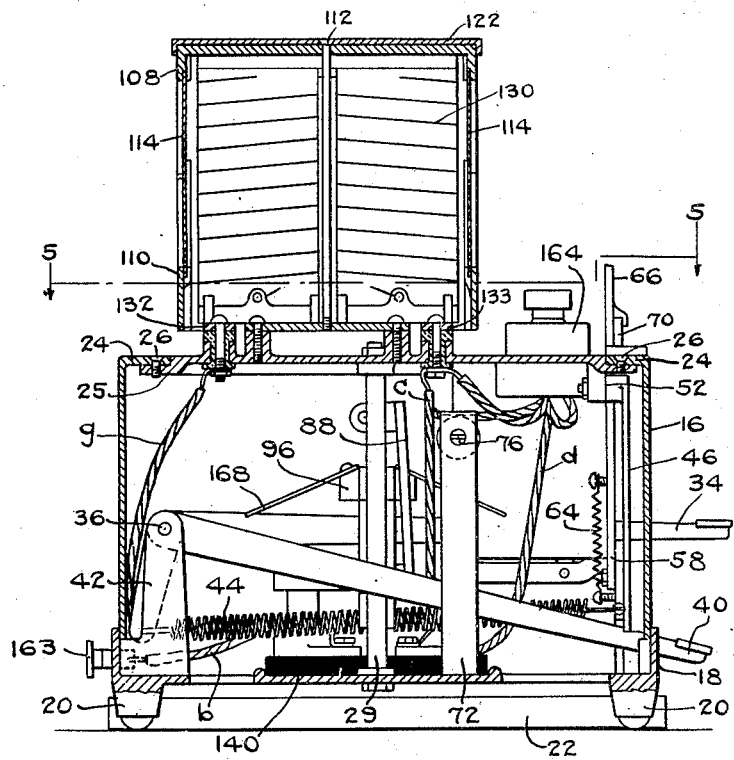
Figure 7:
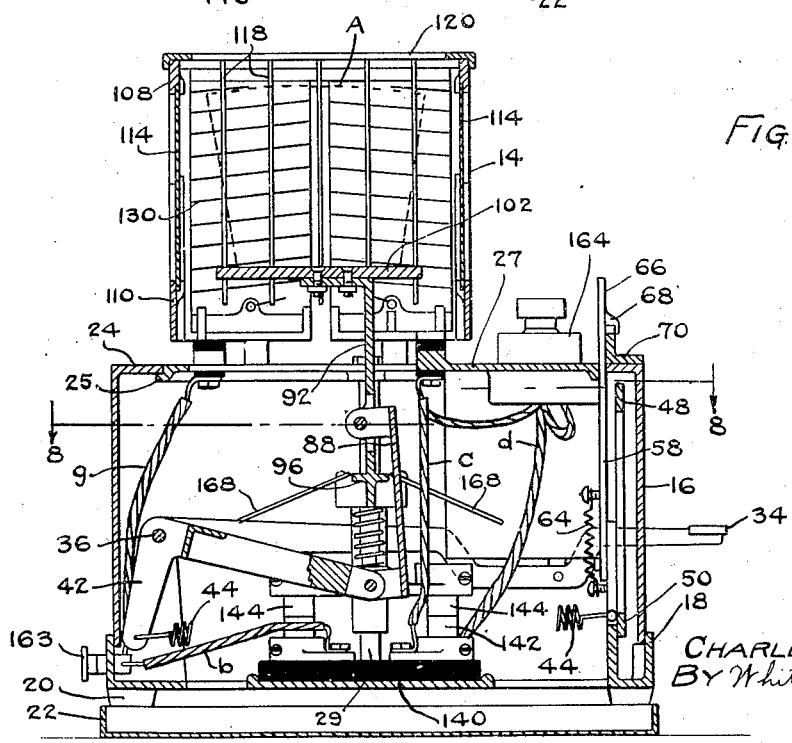

Figure 1 is a front elevational view. Fig. 2 is a side elevational view. Fig. 3 is a sectional detail view showing the manner in which heating wires are secured. Fig. 4 is a top plan view partly broken away. Fig. 5 is a horizontal section on the line 5—5 of Fig. 6. Fig. 6 is a vertical section on the line 6—6 of Fig. 5. Fig. 7 is a vertical section on the line 7—7 of Fig. 8 and showing the device set for toasting. Fig. 8 is a horizontal section on the line 8—8 of Fig. 7. Fig. 9 is a wiring diagram showing the switch in horizontal section. Fig. 10 is a view in vertical section of the switch. Fig. 11 is a front view with the lower casing broken away. Fig. 12 is a view similar to Fig. 7 but showing the device in released position. Fig. 13 is a plan view of a heating element.

Referring to the particular construction shown in the drawings, the numeral 14 designates in general an upper casing or oven which is superposed on a structure which includes a lower casing 16 surrounding the timing mechanism of the toaster. The lower casing 16 is removably supported upon a framework which includes a base having an upwardly-extending flange 18 within which said casing fits. The base is provided with feet 20, and a crumb tray 22 is shown in position between these feet. The casing 16 at its top has an inwardly-extending flange 24 adapted to rest upon offset lugs 25 extending from an open center plate 27 located at the upper part of the frame. The flange 24 is secured to the lugs 25 by screws 26 as shown in Figs. 4, 5 and 6. The plate 27 is carried by two posts 29 extending upwardly from the base portion of the frame. The timing device includes a clockwork mechanism designated in general by the numeral 28 in Fig. 8 and mounted in a box carried by the underside of the plate 27. This clock mechanism is of any usual or well-known construction and therefore need not be disclosed in detail. Secured to a cylindrical member 30 of the clock mechanism is one end of a chain 32 the other end of which is secured to a lever 34 pivoted at its rear end upon a rod 36, as best shown in Fig. 8, this lever being movable up and down in a slot 38 with which the casing 16 and the flange 18 are provided as shown in Fig. 1. A trip lever 40 is also movable up and down in a slot 42 with which said casing and flange are provided. The lever 40 is pivoted at its rear end upon the rod 36, at which place it is provided with a downwardly-extending arm 42 connected by a coiled spring 44 to the front of the frame so that this lever is normally urged into upward position. When the lever 40 is pulled down as far as it will go against the tension of the spring 44 it is engaged by a triangular-shaped gravity catch device, best shown in Fig. 11, and having the members 46, 48 and 50 forming the three sides of the triangle. This catch device is pivoted to the frame at 52 so as to normally swing toward the left as viewed in Fig. 11, and hence the lower end of the member 46 engages the top of the lever 40 when the device is set. In the operation of the toaster, the lever 34 is depressed at the same time or just prior to the depression of the lever 40. The lever 34 when depressed pulls the chain 32 and winds up the spring of the clock mechanism and the operator pushes this lever down until it strikes one end of an adjustable stop arm 54, the other end of which is pivoted at 56 and is secured to an upwardly-extending arm 58, these two arms being connected by a brace arm 60. The pivot at 56 is mounted in a vertical slot 62 formed in a member extending up from the base as shown in Fig. 11, and the pivot is urged into downward position in this slot by a coiled spring 64 attached at its upper end to the arm 58 and attached to the frame at its lower end. The upper end of the arm 58 terminates in a handle portion 66 which carries a detent 68 adapted to be engaged in any one of a number of notches formed in the upper edge of an angular member 70 secured to the casing 16, the horizontal portion of the member 70 bearing numbers corresponding to different notches. Upon lifting the handle 66 the detent is moved from its notch, whereupon the handle may be moved toward the right or left and the detent may then be engaged in any desired notch. By referring to Fig. 11 it will be seen that as the handle is moved toward the right the stop arm 54 is depressed and hence the timing period is increased since the lever 34 may then be depressed to a greater extent. When the lever 34 in its upward travel strikes the arm 48 the lever 40 is released and is quickly pulled up by the spring 44. In order that the lever 40 may not be stopped too abruptly a buffer is provided which consists of two spring arms 72 straddling the lever and converging toward their upper ends, where they are provided with a piece of resilient material 74, best shown in Fig. 11, and held between the spring arms adjustably by a screw 76.

As best shown in Fig. 8, the lever 40 is connected to a movable framework having a transverse arm 78 provided with short rearwardly-extending lugs 80 and 82 pivoted on the rod 36, and also provided with forwardly-extending arms 84 and 86. Pivoted to the front ends of the arms 84 and 86 are upwardly-extending links 88 and 90 which at their upward ends are pivotally attached to uprights 92 and 94 which are connected by a crossbar 96 having at its ends downwardly-extending arms 98 and 100 which have spaced lugs for engagement with opposite sides of the posts 29 as shown in Fig. 8, so as to be guided for sliding movement up and down. The upper ends of the uprights 92 and 94 are provided with strips or carriers 102, and between the uprights 92 and 94 are a pair of uprights 104 which also are provided with carriers 102 on their upper ends so that in the embodiment illustrated, and as best shown in Fig. 1, there are four of these carriers lying in a horizontal plane with each other and movable up and down in unison within the oven 14. This oven is supported upon the plate 27 by posts 106 and consists of a skeleton frame, which for convenience is made with an upper member 108 and a lower member 110 which are held together by screw rods 112, the openings in the frame being filled with material which is a non-absorber of heat preferably mica windows 114. The top of the oven as shown in Figs. 1 and 4 is provided with a plurality of bars 116. As shown in Fig. 1, these bars are arranged in pairs directly above the spaces between the carriers 102, and said bars are notched upon their upper surfaces to receive the bent-over upper ends of longitudinally-extending guide wires 118 which project down through holes in the carriers 102 so that the latter can move up and down while the wires remain at rest for guiding the slices of bread, as will be apparent from Fig. 12. The pieces of bread will rest upon the carriers after insertion through slots 120 formed in a top plate 122 placed over the bars 116 and held in place by the screw rods 112. In the construction shown there are four of the slots 120 and these are located directly above the carriers 102. Heating elements such as shown in Fig. 13 are positioned in the oven between the carriers 102 and also at the outside of the two end carriers. Each heating element, as shown, consists of a pair of sheets of mica 124 held together in spaced relation in a common plane by a binding strip 126 at the top. Each mica sheet at the bottom is provided with a metallic binding strip 126 and eyelets 128 passing through the strips 126 or extended portions thereof, as shown in Fig. 13, which serve to secure the ends of heating wires 130. The ends of these wires are firmly held between the eyelets and the metallic binding strips as shown in Fig. 13, so that a good contact is insured. The wires 130 are wrapped helically upon the mica sheets with their convolutions spaced from each other, while at the tops of the sheets the wires pass from one sheet to the other sheet of the pair, being held in place by passing through holes in the mica. The mica sheets are held in position in the device in the following manner. At the bottom of the oven and supported upon the frame by insulating material 131 there is a rear bus-bar 132 and a front bus-bar of three pieces separated from each other and designated 133, 134 and 135, as best shown in Figs. 5 and 9. These bus-bars are provided with arms 136 and 138 extending toward each other but separated, as shown in Fig. 5, and these arms are provided with three lugs slightly out of alinement with each other to receive the binding strips 126, which on account of the slight bend imparted thereto are firmly held in engagement with the lugs. Some of these lugs, especially the two outer ones of each set of three, may be notched as shown in Fig. 5 to receive the binding strips.

Electric current is supplied to the device in any suitable manner. The apparatus is shown connected to a three-wire system and the current for heating the heating elements is supplied through a switch, best shown in Figs. 9 and 10. Upon a sheet of insulating material 140 there are mounted four carbon contacts 142 held in metal socket members 143 attached to the insulating sheet. Four upper coöperating carbon contacts 144 are resiliently carried by the crossbar 96 of the movable frame in the following manner. Two rods 146 extend slidably through said crossbar, downward movement of these rods being limited by cotter pins 148. Collars 150 fitting loosely upon the lower ends of said rods are held thereon by bolts 152 so that a rocking movement of the collars is permitted. Bars 154 are held to the collars by bolts 156, these bars being insulated from the collars as shown in Fig. 10. The outer ends of the bars constitute sockets for receiving the upper carbon contacts 144. Surrounding the rods 146 are coiled springs 158 held between the collars 150 and the crossbar 96. On account of this mounting each bar 154 may move upwardly as well as rock independently of the other bar. The bars 154 are connected by a flexible metal strip 160 which permits these movements of each bar independently of the other. With this construction of switch in mind the wiring system shown will be readily understood. At the rear of the apparatus there are three binding posts, 161, 162 and 163, of which the posts 161 and 163 are connected to feed wires and the post 162 is connected to a return wire. The post 161 is connected by a wire $a$ with the socket member which holds one of the rear lower carbons 142, while the post 163 is connected by a wire $b$ with a socket member which holds the other of the rear lower carbons. The socket member which holds one of the front lower carbons is connected by a wire $c$ with the portion 134 of the front bus-bar, while the socket member which holds the other of the front lower carbons is connected by a wire $d$ with contact posts of two snap switches 164 and 166, the other contact post of the switch 164 being connected by a wire $e$ with the member 133 of the front bus-bar, while the other contact post of the switch 166 is connected by a wire $f$ with the member 135 of the front bus-bar. The member 135 is connected by the heating wire of one of the end heating elements with the rear bus-bar, while the member 133 is connected by the heating wire of the other end heating element with the rear bus-bar. The intermediate member 134 of the front bus-bar is connected by the heating wires of the intermediate heating elements with the rear bus-bar, while the latter is connected by the return wire $g$ with the binding post 162. In order to prevent crumbs dropping upon the switch a shield 168 may be placed thereover.

The operation and advantages of my invention will be readily understood from the foregoing description, it being understood that the binding posts 161, 162 and 163 are connected in suitable manner to a source of electricity so that current will be conveyed to the heating elements when the carbon contact switch is closed. Assuming this switch to be open as shown in Fig. 12, slices of bread A are inserted in the slots 120, the lever 34 is pushed down to an extent determined by the position of the adjustable stop 54, as shown in Fig. 11, thereby winding the spring of the clock mechanism, and the lever 40 is pushed down until it is engaged under the pivoted gravity catch. The latter operation lowers the carriers upon which the slices of bread are resting and closes the switch. If it is desired to toast two slices of bread only, then both of the snap switches 164 and 166 are turned off, as shown in Fig. 9 and the two center slots only are used. When thus arranged current will pass through the main switch of the apparatus and the wire $c$ to the bus-bar member 134 and through the heating elements connected thereto and from the rear bus-bar 132 through the return wire $g$. If it is desired to toast three slices either one of the snap switches, for instance the right-hand one, is closed and the third slice is placed in the right-hand slot. In addition to the circuit already mentioned there will then be a circuit through the wires $d$ and $f$, bus-bar member 135 and right-hand heating element to the bus-bar 132 and return wire. If the left-hand switch only is closed then there will be a circuit through the wires $d$ and $e$, bus-bar member 133 and left-hand heating element. If both snap switches are closed then it is obvious that current will flow through all of the heating elements. After the apparatus has been set in the desired manner the lever 34 is gradually drawn upwardly by the clock mechanism, and when this lever strikes the arm 48 and moves the same upwardly the lever 40 is released and quickly pulled up by the spring 44 so that the current is cut off and the toasted bread is removed or lifted partly out of the oven, thus permitting it to be readily grasped. The action of the carbon switch is particularly reliable and is particularly adapted for use in this toaster on account of the upper carbon contacts being mounted resiliently and pivotally in the manner previously described. A good contact is insured regardless of uneven wear of the carbons and without the necessity of positioning them with any great accuracy. When the toaster is first started one or two trials will be sufficient to determine the proper setting for the particular kind of bread which is being toasted. If the bread is drier than usual a less time will be required, while if it is more moist a greater time will be required. Since the walls of the oven consist mostly of material which is a non-absorber of heat, a much less quantity of electric current is consumed than would otherwise be the case.

I claim:

1. A bread toaster comprising an oven, heating means associated with said oven, and means for automatically moving the toasted bread from said oven when the toasting operation is completed.

2. A bread toaster comprising an oven, heating means associated with said oven, and means for automatically cutting off the supply of heat and moving the toasted bread from said oven when the toasting operation is completed.

3. A bread toaster comprising an oven, heating means associated with said oven, bread carriers adapted to occupy an inward position within said oven during the toasting operation, and means for automatically moving said bread carriers outwardly with relation to said oven when the toasting operation is completed.

4. A bread toaster comprising an oven having slots for insertion of slices of bread, heating means associated with said oven, and means for automatically moving the toasted bread outwardly through said slots when the toasting operation is completed.

5. A bread toaster comprising an oven having slots for insertion of slices of bread, heating means associated with said oven, and means for automatically cutting off the supply of heat and moving the toasted bread outwardly through said slots when the toasting operation is completed.

6. A bread toaster comprising a frame, an oven mounted on said frame, electrical heating means associated with said oven, a support slidably mounted in said frame, a switch having one portion thereof attached to said support and a coöperating portion attached to said frame, carrying means for slices of bread attached to said support and movable within said oven, and means for controlling the sliding movement of said support.

7. A bread toaster comprising a frame, an oven mounted on said frame, electrical heating means associated with said oven, a support slidably mounted in said frame, a switch having one set of contact members attached to said frame and having means for rockably and resiliently attaching a coöperating set of contact members to said support, carrying means for slices of bread attached to said support and movable in said oven, and means for controlling the sliding movement of said support.

8. A bread toaster comprising an oven including a skeleton frame having windows mounted therein, heating means associated with said oven, said frame having slots in the top thereof for the insertion of slices of bread, and means for moving the toasted bread outwardly through said slots when the toasting operation is completed.

9. A bread toaster comprising an oven, heating means associated with said oven, carriers for slices of bread mounted for vertical movement in said oven, guide wires supported at the top of said oven and extending loosely through said carriers, and means for automatically moving said carriers upwardly in the oven when the toasting operation is completed.

10. A bread toaster comprising an oven, carriers for slices of bread mounted for vertical movement in said oven, sheets of insulating material mounted in said oven adjacent said carriers, heating wires wrapped on said sheets, metallic binding strips secured upon said sheets, eyelets extending through said strips and said sheets with the ends of said heating wires secured between said eyelets and said strips, and means for supplying electrical current to said strips.

11. A bread toaster comprising an oven, carriers for slices of bread mounted for vertical movement in said oven, bus-bars mounted adjacent said oven, sets of lugs slightly out of alinement with each other and carried by said bus-bars, sheet-like heating elements adjacent said carriers, said elements engaging said lugs so as to be held in slightly bent position thereby, and means for controlling the vertical movement of said carriers.

12. A bread toaster comprising an oven, carriers for slices of bread mounted for vertical movement in said oven, bus-bars mounted adjacent said oven, heating elements in said oven connecting said bus-bars, one of said bus-bars consisting of separate members, a switch for controlling the supply of current to said last-mentioned bus-bar, means for separately controlling the supply of current to a member of said bus-bar, and means for causing said switch to open simultaneously with the upward movement of said carriers.

13. A bread toaster comprising an oven having walls of material which is non-heat-absorbing, electrical heating means associated with said oven, and means for automatically cutting off the heating current and moving the toasted bread from said oven when the toasting operation is completed.

In testimony whereof I hereunto affix my signature.

CHARLES P. STRITE.